Patented Jan. 8, 1924.

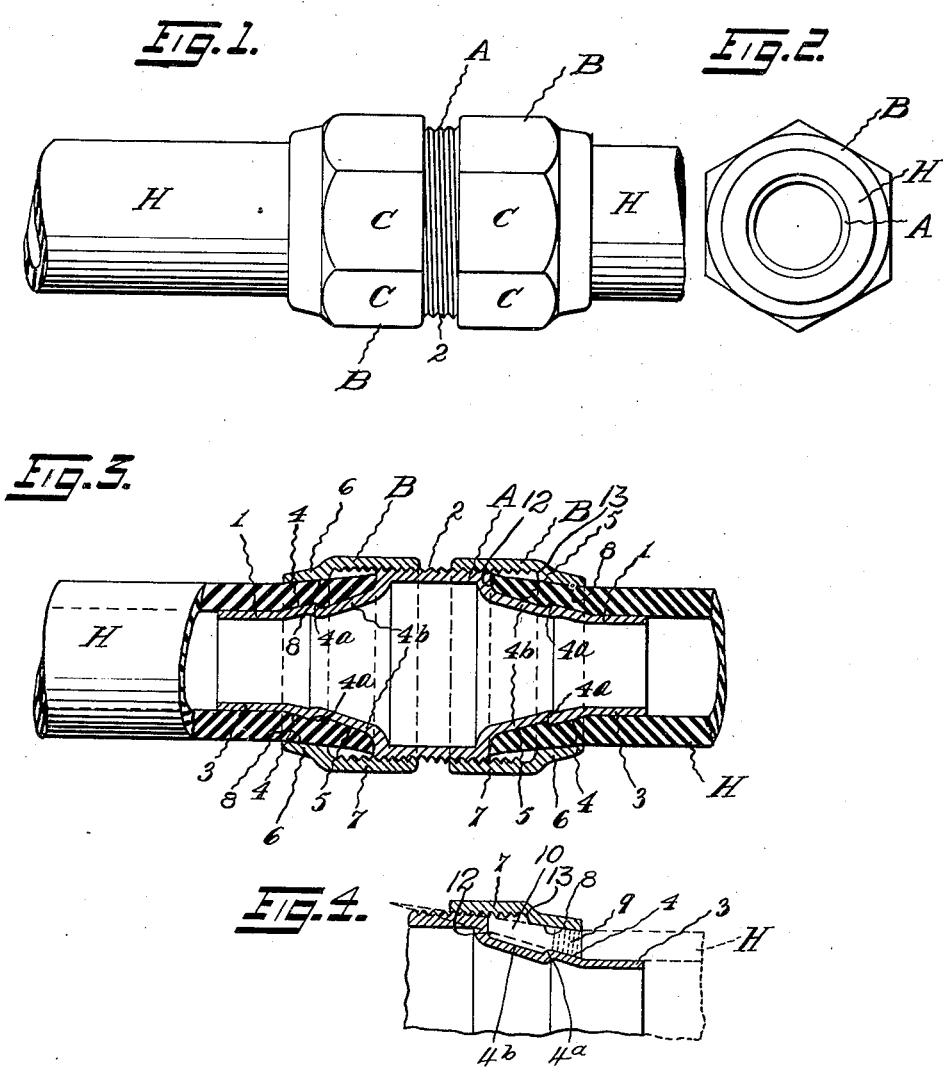

1,479,917

UNITED STATES PATENT OFFICE.

EDWARD A. JOHNSON, OF BROOKLYN, NEW YORK, ASSIGNOR TO APEX SPECIALTIES CORPORATION, OF NEW YORK, N. Y.

HOSE CLAMP.

Application filed November 20, 1919. Serial No. 339,256.

*To all whom it may concern:*

Be it known that I, EDWARD A. JOHNSON, a citizen of the United States, residing in borough of Brooklyn, in the county of Kings and State of New York, have invented certain new and useful Improvements in Hose Clamps, of which the following is a specification.

This invention relates to improvements in hose-clamps, or couplings for pipes of yielding material, and a principal feature of the invention is the compression or clamping of the open ends of the hose or pipe between converging lines of pressure exerted thereupon by the members or parts comprising the invention, whereby the ends of the hose or pipe are securely held in correlative or cooperative connection, and the providing or putting a crimp or turn in the hose or pipe ends adjacent to the points of compression or clamping, which conduces with the compression or clamping, to retain the hose or pipe ends in operative connection and prevent withdrawal of the hose ends from the coupling.

In the accompanying drawings which illustrate a form of the invention, Figure 1 is a perspective side view, showing hose ends connected or coupled together.

Fig. 2 is an end view of the coupling device.

Fig. 3 is a side view, partly in perspective, and partly broken away in longitudinal section, to show in detail the coupling device and hose ends connected or coupled thereby.

Fig. 4 is a diagrammatic fragmentary sectional view showing the zone of compression or clamping of a portion of a hose end, such zones of compression or clamping existing in both hose ends when the hose ends are compressed and connected or coupled by the device.

Similar characters or numerals refer to similar parts throughout the several views.

This invention comprises the thimble A and the screw-caps BB.

The thimble A consists of the tapered ends 1, and the mid-section or mid-portion 2. The tapered ends 1, are provided with the nose portions 3, the compression or clamping faces 4, and the relief faces 5.

Each of the screw-caps BB consists of the jaw portion 6, and the horizontal portion 7.

The jaw portions 6 are provided with the compression or clamping faces 8, which are inclined slightly inwardly, that is towards the line of axis of the screw-caps BB, Figs. 2 and 4.

The exterior of the nose-portions 3 of the thimble A is substantially horizontal, and the interior of the nose-portions 3 is substantially parallel thereto, the exterior diameter of the nose-portions being such as to permit the nose-portions to be inserted snugly into the interior or bore of the hose ends or pipe ends to be coupled, the thimble A being bored for ready passage therethrough of fluid from one hose end or pipe end to the other when the hose ends or pipe ends are connected by the coupling.

The compression or clamping faces 4 of the thimble A are inclined inwardly, that is towards the line of the axis of the thimble A, the line of this incline converging with the line of incline of the compression or clamping faces 8 of the jaw portions 6, of the screw-caps BB in the direction of the mid portion 2 of the thimble, when the members A and BB are in correlative operative position, as in Fig. 3, this convergence being shown in somewhat exaggerated manner for purposes of illustration in Fig. 4, by the dotted lines.

The relief faces 5 of the thimble A consist of curving or rounded shoulders 4$^a$ and inclined faces 4$^b$ substantially parallel to the incline of the clamping faces 4, but arranged in a lower plane than the faces 4 relative to the axis of the thimble, the faces 4 and 4$^b$ being connected by the shoulders 4$^a$. The faces 4$^b$ terminate at the mid-portion 2 of the thimble, the incline 4$^b$ of the relief faces 5 preferably being curved upwardly or outwardly relative to the axis of the thimble A adjacent to the mid-portion 2 and forming the shoulders 12. Relief chambers 10 are formed adjacent to the zone of compression, indicated by 9, between the relief faces 5 of the thimble A and the horizontal portions 7 of the screw caps BB.

The exterior of the mid-section or mid-portion 2, of the thimble A, is provided with a screw-thread, and the interior of the horizontal portions of the screw-caps BB is provided with a screw-thread for engaging the thread of the mid-section or mid-portion of the thimble A.

The screw-caps BB are provided, with exterior faces CC, or are otherwise suitably arranged, for applying a wrench thereto.

In operation. The thimble A and screw-caps BB being in connected position, the nose portions of the thimble A are inserted into the open ends of the hose or pipe H and the hose ends or pipe ends pressed inwardly, the hose or pipe ends passing over the compression or clamping faces 4 and over the relief faces 5 of the thimble. The screw-caps BB are moved inwardly on the mid-section or mid-portion 2 of the thimble A by a wrench or other suitable means, the compression or clamping faces 8 of the screw-caps BB engaging the exterior of the hose ends or pipe ends, and by the compression or clamping faces 4 of the thimble A engaging the interior of the hose ends or pipe ends, a zone of compression of the hose ends or pipe ends, as shown by 9, Fig. 4, is provided and the hose ends or pipe ends are clamped between the screw-caps BB and the thimble A. Due to such compression or clamping the inner ends of the hose or pipe are forced or moved into the relief chambers 10 formed between the relief faces 5 of the thimble A and the interior side of the horizontal portion 7 of the screw-caps BB, the relief faces 5 facilitating this, the effect of which is to put an upward turn or crimp in the hose ends or pipe ends which are relieved from the compression of the clamping face and permitted to expand, and which turn is not a sharp or sudden one likely to cause abrasion of the hose or pipe, and which conduces, with the compression or clamping of the screw-caps BB and thimble A, as at the zone of compression 9, to hold the ends of the hose or pipe securely in the coupling and prevent withdrawal therefrom.

The cylindrical mid-section A is provided with a continuous screw thread 2 extending from end to end of the exterior thereof so that the interiorly threaded portions of either screw cap may engage more than half of the screw thread of said mid-section A, as when one hose or pipe end is larger or more compressible than the other. The mid-section of the thimble is provided at each end with an annular abutment shoulder 12 perpendicular to the axis of the thimble and joining said outwardly inclined relief face 4ª and said mid-section A; and each screw cap has an annular compression shoulder 13 joining said clamping faces 8 and opposing said abutment shoulders. As stated said faces 4ª and 4ᵇ and shoulders 12 and 13 provide the relief chambers 10 for the hose or pipe ends; and said shoulders 12 and 13 serve to longitudinally compress the portion of the hose or pipe between said shoulders thereby to expand and thicken said portion and force it into the relief chambers and into holding engagement with said compression shoulder 13 and relief face 4ª.

Having thus described my invention it should be understood that there may be modifications thereof and variations therein without departing from the spirit of my invention or exceeding the scope of the appended claims.

What I claim is:

1. A hose clamp comprising, a thimble having tapered portions at each of its ends and straight nose portions; screw caps engageable with said tapered portions for providing zones of compression for the hose ends; and a relief chamber adjacent to each zone of compression for receiving a hose end and adapted to turn the hose end in said chamber in direction outwardly relative to the axis of the thimble for preventing withdrawal of the hose end from the chamber; the straight nose portions being insertible in the ends of the hose for interiorly supporting the hose adjacent to the zones of compression for preventing breaking of the hose at said zones.

2. A hose clamp comprising, a thimble having a central bore, a horizontal mid portion, tapered portions adjoining the mid portion, and straight nose portions adjoining the tapered portions; and screw caps having horizontal portions engageable with the mid portion of the thimble and clamping faces adjoining the horizontal portions; said clamping faces cooperating with tapered portions of the thimble for providing zones of compression for ends of the hose; the screw caps and tapered portions of the thimble forming a relief chamber adjacent to each zone of compression adapted to receive a hose end and turn said end in said chamber in directions outwardly relative to the axis of the thimble for preventing withdrawal of said end from said chamber; the straight nose portions of the thimble being insertible in the ends of the hose for interiorly supporting the hose adjacent to said zones of compression for preventing breaking of the hose at said zones.

3. A hose clamp comprising, a thimble having a central bore; a horizontal exteriorly threaded mid portion and tapered portions adjoining the mid portion; the thimble having shoulders adjoining the mid portion at each end thereof providing curved surfaces; the tapered portions being depressed for a portion of their lengths and said curved surfaces merging in the depressed portions; and screw caps having horizontal interiorly screw threaded portions engageable with the mid portion of the thimble and having adjoining the horizontal portions inwardly inclined clamping faces, there being shoulders at the junction of the horizontal portions and clamping faces whereby the horizontal portions are in higher planes than the clamping faces; said clamping faces cooperating with tapered portions of the thimble for providing zones of compression for hose ends; the horizontal portions of the screw caps and the depresed tapered portions of the thimble providing a relief chamber adjacent to each zone of compression for receiving a hose end; said end being turned in said chamber outwardly relative to the axis of the thimble for preventing withdrawal of said end from said chamber.

4. A hose clamp comprising, a thimble having a central bore, a horizontal exteriorly threaded mid portion, tapered portions adjoining the mid portion and straight nose portions adjoining the tapered portions; the thimble having shoulders adjoining the mid portion at each end thereof providing curved surfaces; the tapered portions being depressed for a portion of their lengths and said curved surfaces merging in the depressed portions; and screw caps having horizontal interiorly screw threaded portions engageable with the mid portion of the thimble and having adjoining the horizontal portions inwardly inclined clamping faces, there being shoulders at the junction of the horizontal portions and clamping faces whereby the horizontal portions are in higher planes than the clamping faces; said clamping faces cooperating with tapered portions of the thimble for providing zones of compression for hose ends; the horizontal portions of the screw caps and the depressed tapered portions of the thimble providing a relief chamber adjacent to each zone of compression for receiving a hose end; said end being turned in said chamber outwardly relative to the axis of the thimble for preventing withdrawal of said end from said chamber; said straight nose portions being insertible in the ends of the hose for interiorly supporting the hose adjacent to said zones of compression for preventing breaking of the hose at said zones.

EDWARD A. JOHNSON.

Witnesses:
GEORGE J. BARTELS,
FRED T. SESS.